Patented Dec. 4, 1951

2,577,621

UNITED STATES PATENT OFFICE 2,577,621

PRODUCTION OF POLYAMIDES OF HIGH MOLECULAR WEIGHT UTILIZING 1:4-BIS-(3-AMINOPROPOXY)-CYCLOHEXANE

Geoffrey Bilson May and James Wotherspoon Fisher, Spondon, near Derby, England

No Drawing. Original application August 3, 1948, Serial No. 42,350. Divided and this application December 28, 1950, Serial No. 203,228. In Great Britain August 22, 1947

4 Claims. (Cl. 260—78)

This application relates to certain novel polymeric substances, and is a divisional of our copending application Serial No. 42,350.

We have found that compounds containing a 1:4-bis-ethoxy-cyclohexane residue can be made by a process which includes the step of causing acrylonitrile to react with quinitol in a reaction mixture containing the acrylonitrile and quinitol in a molecular ratio of 2:1 or higher and in the presence of a basic substance as a catalyst. The primary product of the reaction is 1:4-bis-(2-cyanoethoxy)-cyclohexane, and this compound can readily be converted into 1:4-bis-(3-aminopropoxy)-cyclohexane by catalytichydrogenation and into 1:4-bis-2-carboxyethoxy)-cyclohexane or esters thereof by hydrolysis or alcoholysis.

The reaction of the quinitol and acrylonitrile may be carried out by heating quinitol with acrylonitrile, preferably in solution and preferably in the presence of a small amount of a substance capable of inhibiting addition polymerisation of unsaturated compounds, e. g. quinol. We have found it best to employ a considerable excess of the acrylonitrile, especially 4–12 and more particularly 5–8 molecular proportions for each molecular proportion of quinitol. Advantageously the acrylonitrile and quinitol are dissolved in an alcohol containing an alkali metal alkoxide, and it is preferable to employ only sufficient alcohol to dissolve the reactants or not much more than that amount. Thus a concentrated solution of the quinitol and acrylonitrile, together with a trace of quinol as polymerisation inhibitor, in ethyl alcohol to which a little sodium has been added, may be boiled under reflux for a few hours, e. g. for 1–3 hours. If the solution is then filtered and cooled, 1:4-bis-(2-cyanoethoxy)-cyclohexane separates out and can be filtered off and, if desired, recrystallised from hot water. Unchanged acrylonitrile and quinitol can be recovered from the filtrate, for example, by first distilling off the acrylonitrile under atmospheric pressure and then distilling the bulk of the residue under reduced pressure and cooling this second distillate to cause the quinitol to separate out.

The hydrogenation of the bis-cyanoethoxy-cyclohexane to 1:4-(3-aminopropoxy)-cyclohexane can be carried out by heating a solution of the bis-cyanoethoxy-cyclohexane with a hydrogenation catalyst under a suitable hydrogen pressure, preferably in the presence also of ammonia. Examples of suitable solvents are methanol and dioxane. Nickel hydrogenation catalysts have been found to be effective, especially a catalyst comprising nickel deposited on kieselguhr or Raney nickel. With nickel catalysts of these types the hydrogenation may be carried out at a temperature between about 50° C. or 100° C. and 150° C. under a hydrogen pressure of 50–300 atmospheres. When the hydrogenation is complete, the catalyst may be filtered off or otherwise separated from the products of the hydrogenation, and the bis-aminopropoxy-cyclohexane isolated by evaporating off the solvent.

Cyclohexane and its derivatives exist in two geometrically isomeric forms known respectively as the cis and trans forms, the latter being the more stable. When quinitol is produced by the catalytic hydrogenation of quinol, a mixture of the cis and trans forms is obtained, and it is possible, by heating this mixture, to obtain a product which is substantially wholly the trans form; if the cis form is required, it may be separated from admixture with the trans form by making use of the different solubilities of the two forms in acetone. The reactions described in this present specification take place with both the cis and trans forms and also with mixtures of the two forms of quinitol and the alkoxy-cyclohexane derivatives made from it.

Among the novel ethers with which the invention is concerned, 1:4-bis-(3-aminopropoxy)-cyclohexane is of special interest as an intermediate in the manufacture of polymeric substances, including high linear polymers. Thus a mixture of 1:4-bis-(3-aminopropoxy)-cyclohexane and a dibasic carboxylic acid, especially a dicarboxylic acid, or an amide-forming derivative of a dibasic carboxylic acid, or a salt of the bis-aminopropoxy-cyclohexane and the dibasic acid, may be heated until a polyamide has been formed. Examples of dicarboxylic acids which will produce polyamides by reaction with the bis-aminopropoxy-cyclohexane are adipic acid, sebacic acid and other straight chain aliphatic dicarboxylic acids having the carboxyl groups in the terminal positions, terephthalic acid, bis-(p-carboxyphenoxy)-alkanes, e. g. 1:2-bis-(p-carboxyphenoxy)-ethane, 1:6-bis-(p-carboxyphenoxy)-hexane and the corresponding thioether acids, 2:2'-bis-(p-carboxyphenoxy)-diethyl ether and similar derivatives of other dialkyl ethers and of dialkyl thio-ethers, hydroquinone diacetic acid (1:4-bis-(carboxymethoxy)-benzene), hydroquinone di-p-benzoic acid (1:4-bis-(p-carboxyphenoxy)-benzene), bis-(p-carboxyphenyl)-methane and bis-(p-carboxyphenyl) derivatives of other alkanes, p:p'-dicarboxydiphenyl naphthalene-1:5, 2:6- and 2:7-dicarboxylic acids, 1:4-bis-(p-carboxyphenoxymethyl)-benzene, and p:p'-dicarboxydiphenylether and the corresponding thio-ether. Short chain dicarboxylic acids, i. e. acids containing fewer than 6 carbon atoms such as oxalic acid, and also carbonic acid, can be used (preferably in the form of their esters), especially if fibre-forming properties are not desired. On being subjected to hydrolysis all these polymers yield 1:4-bis-(3-aminopropoxy)-cyclohexane (in the form of a salt with the hydrolysing acid) and the free dibasic carboxylic acid.

In the production of the polyamides it is preferred to heat the basic and acidic reactants or a salt formed therefrom to a temperature above 200° C. and especially above 220° C., advantageously in the practical absence of oxygen, e. g. in a hydrogen or nitrogen atmosphere. The polymerisation may be effected in a single continuous operation or in two or more operations; for example a polymer of relatively low molecular weight may first be formed, and if it is desired to produce a polymer of high molecular weight, for instance a polymer having fibre-forming properties, the relatively low polymer can be further heated until it has acquired the desired qualities. In the early stages of the polymerisation, the reactants or a salt formed therefrom may be heated under substantially atmospheric pressure or under a pressure higher than atmospheric produced, for example, by working under constant volume conditions in a pressure vessel; usually, however, in order to produce a product capable of being formed into useful fibres, it is advisable in the final stages to reduce the pressure to below 5 mm. and preferably to about 2 mm. or lower.

In order to produce polymers of high molecular weight the basic and acid reactants should be employed in substantially equimolecular quantities. (The expression "substantially equimolecular quantities" is employed to indicate that neither reactant is present in an excess greater than 5% over the other; preferably neither is present in an excess greater than 2%.) If polymers having fibre-forming properties are desired, the acid reactant preferably comprises two carboxyl groups separated by a chain of at least four atoms.

If desired 1:4-bis-(3-aminopropoxy)-cyclohexane can be used in association with other diamines, especially straight chain aliphatic diamines such, for example, as hexamethylene diamine or tetramethylene diamine, in the production of mixed polyamides. Similarly mixtures of more than one dibasic acid can be used if desired, for instance mixtures of two or more of the dicarboxylic acids mentioned above.

High linear polymers made in accordance with the invention may be used in the manufacture of filaments, yarns and other shaped products by melt-spinning methods and also in moulding compositions and the like.

It is also possible to use the novel ethers, especially 1:4-bis-(3-aminopropoxy)-cyclohexane, in the production of insoluble and infusible resins by causing them to react with compounds containing 3 or more reactive groups so that cross-linking can occur.

Either the cis or trans forms or mixtures of the cis and trans forms of the ethers can be used in the production of polymers.

The invention is illustrated by the following examples; the parts specified are in all cases parts by weight.

Example 1

273 parts of quinitol, 752 parts of acrylonitrile and 9.4 parts of quinol were added to 95% ethyl alcohol to which a little sodium had been added so as to form sodium ethoxide, and the mixture was boiled under reflux conditions for 1½ hours. A green black solution was obtained which, while still hot, was filtered. On cooling the solution, a brown solid separated out; this was filtered off and washed with cold water until it was nearly white and was then recrystallised from hot water. The product was 1:4-bis-(2-cyanoethoxy)-cyclohexane, crystallizing in white needles of M. P. 112° C.

Example 2

46 parts of 1:4-bis-(2-cyanoethoxy)-cyclohexane was introduced into an autoclave together with 63 parts of methanol, 32 parts of liquid ammonia and a catalyst consisting of nickel deposited on kieselguhr. Hydrogen was admitted under a pressure of 240 atmospheres and the autoclave heated to 130" C.–140° C. for about 1 hour. After being cooled the products were freed from the catalyst by filtration and the methanol was distilled off under atmospheric pressure. The residue was distilled under a pressure of 30 mm., and the crude 1:4-bis-(3-aminopropoxy)-cyclohexane so obtained was purified by fractional distillation, again under 30 mm. pressure, the fraction coming over at 205°–212° C. under this pressure being collected.

11.5 parts of 1:4-bis-(3-aminopropoxy)-cyclohexane and 7.3 parts of adipic acid were dissolved in separate portions of methanol and the solutions mixed. A very dilute solution of the diamine in methanol was then added cautiously until the mixture was feebly alkaline to litmus. Ether was then added until the adipate of the diamine precipitated as a white solid of M. P. 176° C.

This salt was heated under nitrogen for 2¼ hours at 200° C., and then at 220° C. for a further hour under a pressure of 2 mm. The product was a light-coloured, hard polymer of M. P. 196° C. which could be formed into fibres capable of being cold drawn and insoluble in water and acetone.

Example 3

7.3 parts of diethyl oxalate was dissolved in 4 parts of methanol and added very gradually to a solution of 11.5 parts of 1:4-bis-(3-aminopropoxy)-cyclohexane in 4 parts of methanol. A considerable amount of heat was evolved and a heavy white solid precipitated. The mixture was well stirred and allowed to cool and the white solid filtered off. This white solid was a low polymer of M. P. 251° C., insoluble in water and methanol. To obtain a high polymer the solid was heated under nitrogen at 260° C. until it had melted, whereupon the pressure was reduced to 2 mm. and heating continued at about the same temperature for 2 hours. The polymer produced had M. P. 246° C.

A similar product was obtained by heating a mixture of equal parts of the low polymer and m-cresol for 3 hours at 210°–220° C. under nitrogen, dissolving the product in formic acid and precipitating the polymer with water.

Example 4

4.6 parts of 1:4-bis-(3-aminopropoxy)-cyclohexane was dissolved in methanol and the solution added to 3.3 parts of terephthalic acid and sufficient water to give an 80% aqueous methanol, and the solution was boiled under reflux until it became clear. It was then diluted with methanol and allowed to cool, whereupon the terephthalate of the diamine gradually crystallized out as a white, water-soluble solid of M. P. 262° C.

Equal amounts of this salt and of m-cresol were heated under nitrogen at 220° C. for about 1½ hours, after which the resultant polymer had separated as a light-coloured, hard mass of M. P. 284° C., insoluble in water and acetone and yielding fibres capable of being cold drawn.

Example 5

4.6 parts of 1:4-bis-(3-aminopropoxy)-cyclohexane was dissolved in 80% aqueous methanol and boiled under reflux with 6.04 parts of 1:2-bis-(p-carboxyphenoxy)-ethane until a clear solution was obtained. The solution was then diluted with methanol, whereupon the diamine salt of the dicarboxylic acid percipitated as a white crystalline solid of M. P. 239°-240° C.

Equal weights of this salt and of m-cresol were heated under nitrogen for 1 hour at 210°-220° C., after which the solution was allowed to cool, whereupon it set to a light-coloured, hard mass. This was dissolved in cold formic acid and the solution so obtained was poured into water to precipitate the polymer as a powder of M. P. 250° C. which could be formed into fibres capable of being cold drawn.

Alternatively, the salt was heated in the absence of a solvent under nitrogen to 260° C. for 20 minutes and then for a further hour at the same temperature but under a pressure of 2 mm. The properties of the polymer so obtained were similar to those of the polymer obtained by carrying out the polymerisation in the presence of m-cresol.

Example 6

2.3 parts of 1:4-bis-(3-aminopropoxy)-cylohexane was dissolved in 80% aqueous methanol and boiled under reflux with 3.3 parts of 1:4-bis-(p-carboxyphenoxy)-butane until a clear solution was obtained, 5 parts of water being added after 10 minutes to aid solution. The resulting solution was diluted with methanol and cooled, whereupon the salt of the diamine and dicarboxylic acid slowly crystallized as a white powder of M. P. 200° C. The salt was heated under nitrogen at 240° C. for 4 hours and then under pressure of 2 mm. at 240° C. for 1 hour and at 260°-270° C. for a further hour. The product was a light-coloured polymer of M. P. 224° C. capable of being formed into fibres.

Example 7

2.3 parts of 1:4-bis-(3-aminopropoxy)-cyclohexane was dissolved in 80% aqueous methanol and the solution boiled under reflux with 3.58 parts of 1:4-bis-(p-carboxyphenoxy)-cyclohexane until a clear solution was obtained, 5 parts of water being added after about 10 minutes to aid solution. The resulting solution was diluted with methanol and cooled, whereupon the salt slowly crystallized as a white powder of M. P. 203°-204° C. The salt was heated under nitrogen for ½ hour at 240° C. and then for 1 hour at the same temperature but under a pressure of 2 mm. The polymer obtained had M. P. 210°-215° C. and gave fibres capable of being cold drawn.

Example 8

2.3 parts of 1:4-bis-(3-aminopropoxy)-cyclohexane was dissolved in 80% aqueous methanol and boiled under reflux with 3.46 parts of 2:2'-bis-(p-carboxyphenoxy)-diethyl ether until a clear solution was obtained. The solution was concentrated and dioxane added to precipitate the salt as a white solid of M. P. 196° C. The salt was heated under nitrogen for 1 hour at 240° C. and then for 4 hours at 250°-260° C. under 2 mm. pressure. The polymer obtained had M. P. 120°-125° C. and was capable of being formed into fibres.

Example 9

2.7 parts of 1:4-bis-(3-aminopropoxy)-cyclohexane was dissolved in 80% aqueous methanol and an equal weight of hydroquinone diacetic acid added. The solution was then diluted with methanol, in order to cause the salt so formed to separate as a soft crystalline sold of M. P. 202° C. The salt when heated for ½ hour at 240° C. under nitrogen gave a polymer of M. P. 155°-160° C. which could be formed into fibres capable of being cold drawn.

Having described our invention, what we desire to secure by Letters Patent is:

1. Process for the manufacture of polymeric substances which comprises heating together until a polyamide has been formed substantially equimolecular quantities of 1:4-bis-(3-aminopropoxy)-cyclohexane and a substance selected from the group which consists of dicarboxylic acids in which the chain separating the two carboxyl groups comprises at least one p-phenylene group and amide-forming derivatives of such dicarboxylic acids.

2. Process for the manufacture of polymeric substances which comprises heating together until a polyamide has been formed substantially equimolecular quantities of 1:4-bis-(3-aminopropoxy)-cyclohexane and terephthalic acid.

3. As new substances, linear fibre-forming polyamides which on hydrolysis yield substantially equimolecular proportions of 1:4-bis-(3-aminopropoxy)-cyclohexane and a dicarboxylic acid containing at least one p-phenylene group in the chain separating the carboxyl groups.

4. As new substances, linear fibre-forming polyamides which on hydrolysis yield substantially equimolecular proportions of 1:4-bis-(3-aminopropoxy)-cyclohexane and terephthalic acid.

GEOFFREY BILSON MAY.
JAMES WOTHERSPOON FISHER.

REFERENCES CITED

The following references are of record in the file of this patent:

UNITED STATES PATENTS

| Number | Name | Date |
| --- | --- | --- |
| 2,334,782 | Martin | Nov. 23, 1943 |
| 2,359,867 | Martin | Oct. 10, 1944 |

FOREIGN PATENTS

| Number | Country | Date |
| --- | --- | --- |
| 880,302 | France | Mar. 23, 1943 |

Certificate of Correction

Patent No. 2,577,621 December 4, 1951

GEOFFREY BILSON MAY ET AL.

It is hereby certified that the above numbered patent was erroneously issued to the inventors "Geoffrey Bilson May" and "James Wotherspoon Fisher" whereas said patent should have been issued to *Celanese Corporation of America, a corporation of Delaware, as assignee of the entire interest therein;* and that the said Letters Patent should be read as corrected above, so that the same may conform to the record of the case in the Patent Office.

Signed and sealed this 11th day of March, A. D. 1952.

[SEAL]

THOMAS F. MURPHY,
*Assistant Commissioner of Patents.*